(12) United States Patent
Fukuuchi et al.

(10) Patent No.: US 12,010,279 B2
(45) Date of Patent: Jun. 11, 2024

(54) IMAGE READING DEVICE AND IMAGE FORMING APPARATUS CAPABLE OF ALLOWING OR DISALLOWING CONVEYANCE OF ORIGINAL DOCUMENT THROUGH CURVED CONVEYANCE PATH DEPENDING ON LENGTH OF ORIGINAL DOCUMENT

(71) Applicant: KYOCERA Document Solutions Inc., Osaka (JP)

(72) Inventors: Risa Fukuuchi, Osaka (JP); Masayoshi Takahashi, Osaka (JP); Takuro Murata, Osaka (JP); Masahiro Nakao, Osaka (JP); Taro Kurahashi, Osaka (JP); Shunsuke Sasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 22 days.

(21) Appl. No.: 18/209,824

(22) Filed: Jun. 14, 2023

(65) Prior Publication Data

US 2023/0412744 A1 Dec. 21, 2023

(30) Foreign Application Priority Data

Jun. 21, 2022 (JP) ................................. 2022-099855

(51) Int. Cl.
*H04N 1/00* (2006.01)
(52) U.S. Cl.
CPC ....... *H04N 1/00602* (2013.01); *H04N 1/0071* (2013.01); *H04N 1/00713* (2013.01); *H04N 1/00777* (2013.01)

(58) Field of Classification Search
None
See application file for complete search history.

(56) References Cited

U.S. PATENT DOCUMENTS

2020/0213460 A1* 7/2020 Naito ................. H04N 1/00716
2021/0101769 A1* 4/2021 Kawasaki ............. B65H 31/24
(Continued)

FOREIGN PATENT DOCUMENTS

JP H11127301 A 5/1999

*Primary Examiner* — Henok Shiferaw
(74) *Attorney, Agent, or Firm* — IP BUSINESS SOLUTIONS, LLC

(57) ABSTRACT

An image reading device includes a document tray, a linear conveyance path, a curved conveyance path, a document conveyance device, a scanning device, a length detecting device, an operation device, and a controller. A plurality of conveyance rollers are disposed at a predetermined first interval in the linear conveyance path. In the curved conveyance path, a plurality of conveyance rollers are disposed at a predetermined second interval longer than the first interval. When accepting through the operation device an instruction for conveying an original document through the curved conveyance path, the controller allows conveyance of the original document through the curved conveyance path when a length of the original document detected by the length detecting device is not shorter than the second interval or disallows conveyance of the original document through the curved conveyance path when the detected length of the original document is shorter than the second interval.

8 Claims, 12 Drawing Sheets

(56) References Cited

U.S. PATENT DOCUMENTS

2023/0269337 A1\* 8/2023 Eguchi ............... H04N 1/00612
   358/498
2023/0283727 A1\* 9/2023 Kimura ................. G03G 15/00
   358/1.14

\* cited by examiner

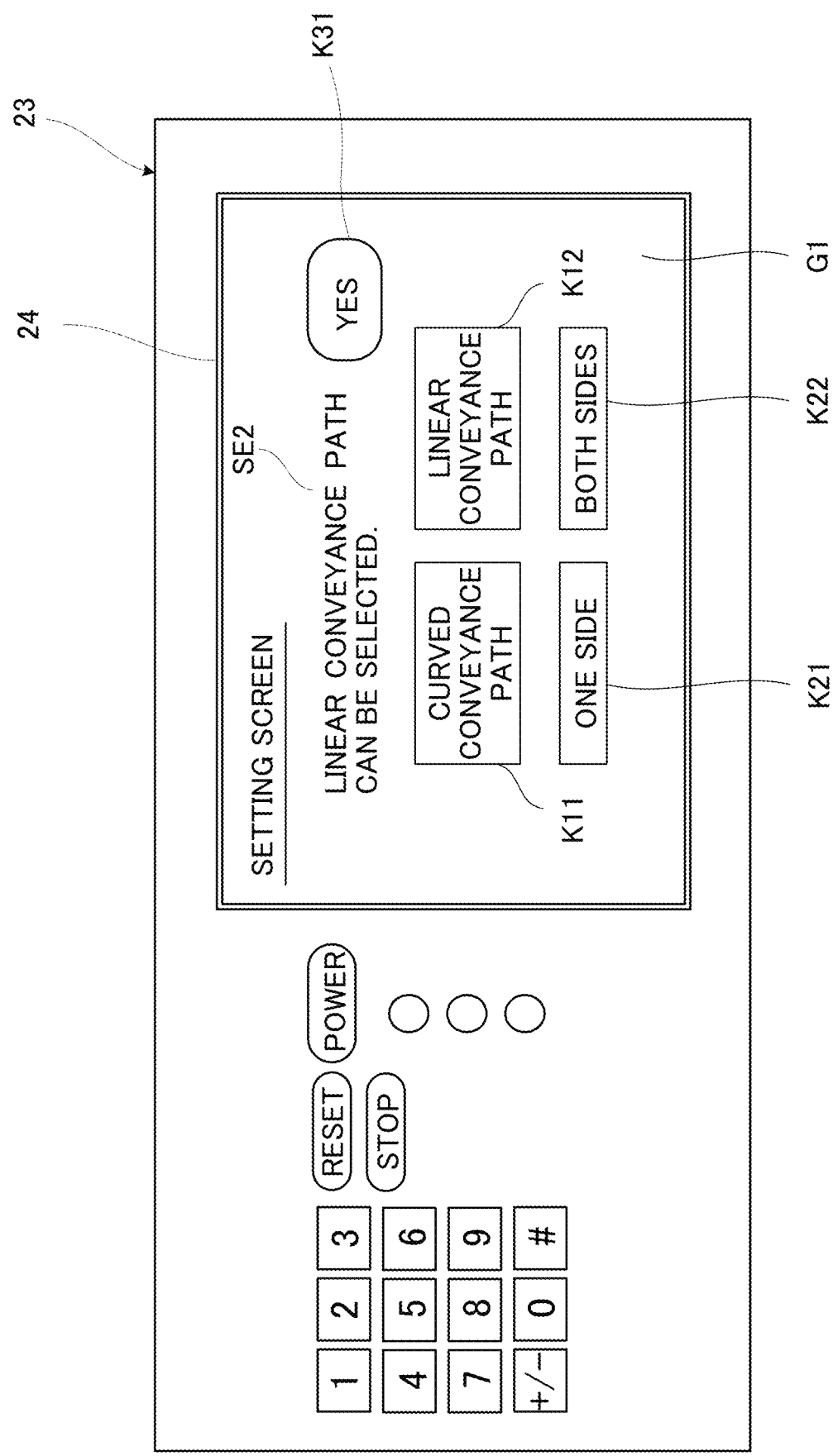

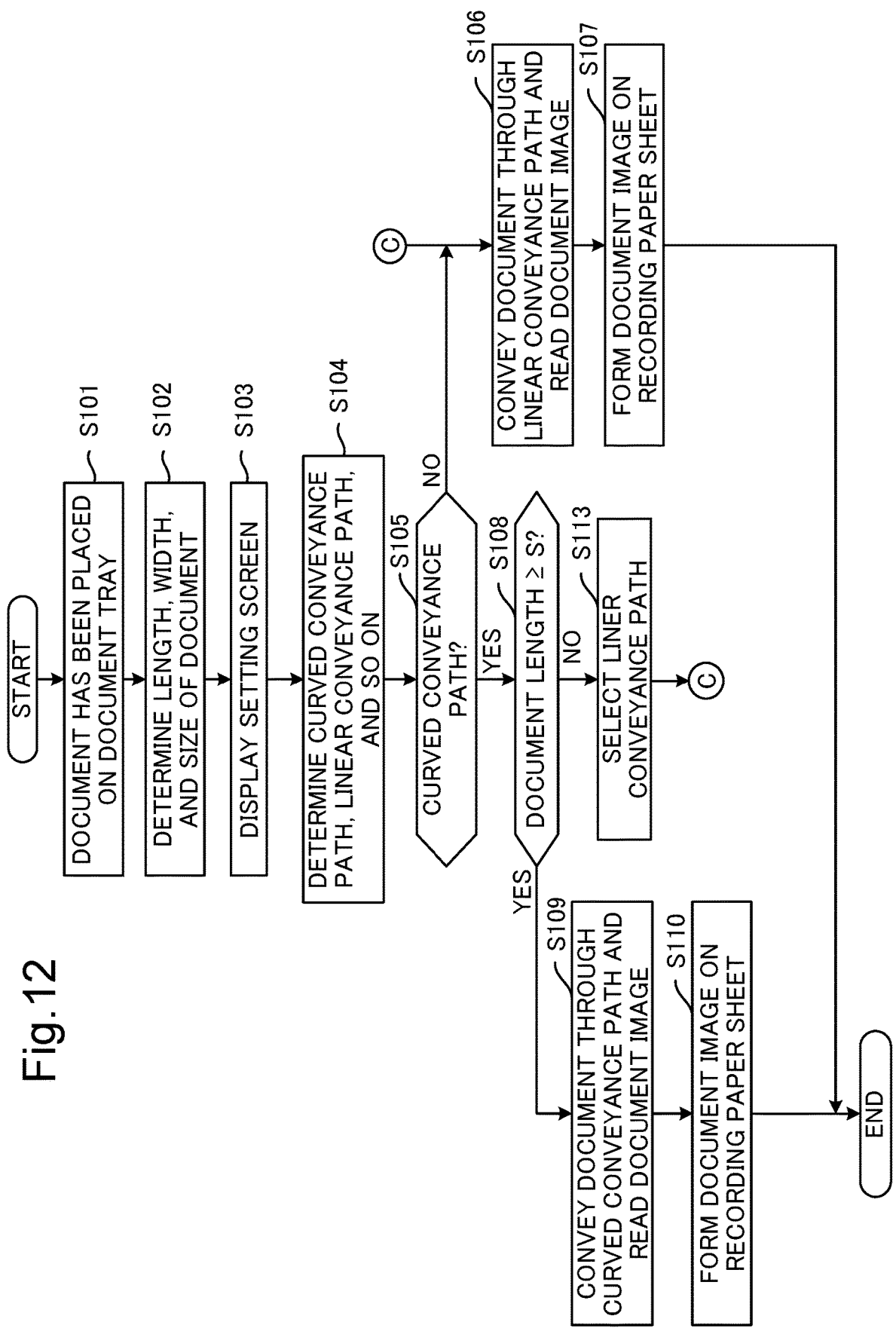

IMAGE READING DEVICE AND IMAGE FORMING APPARATUS CAPABLE OF ALLOWING OR DISALLOWING CONVEYANCE OF ORIGINAL DOCUMENT THROUGH CURVED CONVEYANCE PATH DEPENDING ON LENGTH OF ORIGINAL DOCUMENT

INCORPORATION BY REFERENCE

This application claims priority to Japanese Patent Application No. 2022-099855 filed on 21 Jun. 2022, the entire contents of which are incorporated by reference herein.

BACKGROUND

The present disclosure relates to image reading devices capable of reading an image of an original document while conveying the original document and image forming apparatuses with such an image reading device. The present disclosure particularly relates to a technique for selectively using a curved conveyance path and a linear conveyance path through either of which an original document is conveyed.

Image reading devices read an image of an original document placed on a platen glass or read an image of an original document having been pulled out of a document tray and being conveyed. For example, there is generally known an image reading device designed to pull out an original document from a document tray, convey the original document through a curved conveyance path or a linear conveyance path, and read an image of the original document being conveyed through the curved conveyance path or the linear conveyance path. The curved conveyance path is suitable for conveying an original document made of a flexible thin sheet. The linear conveyance path is suitable for conveying an original document made of an inflexible cardboard material, such as a business card or other types of cards.

In the general image reading device described above, an original document is irradiated with light from a light-emitting part, light having passed through the original document is received by a light-receiving part, and the thickness of the original document is determined based on the amount of light received by the light-receiving part. When the thickness of the original document is determined to be less than a predetermined thickness, a conveyance path switching device allows the original document to be conveyed through the front side of the image reading device (through the curved conveyance path). When the thickness of the original document is determined to be equal to or more than the predetermined thickness, the conveyance path switching device allows the original document to be conveyed through the rear side of the image reading device (through the linear conveyance path).

SUMMARY

A technique improved over the aforementioned technique is proposed as one aspect of the present disclosure.

An image reading device according to an aspect of the present disclosure includes a document tray, a linear conveyance path extending approximately linearly, a curved conveyance path, a document conveyance device, a scanning device, a length detecting device, an operation device, and a controller. In the linear conveyance path, a plurality of conveyance rollers capable of conveying an original document are disposed at a predetermined first interval. In the curved conveyance path, a plurality of conveyance rollers capable of conveying an original document are disposed at a predetermined second interval longer than the first interval. The document conveyance device pulls out the original document placed on the document tray from the document tray and conveys the pulled original document through one of the linear conveyance path and the curved conveyance path. The scanning device reads an image of the original document being conveyed through the linear conveyance path and an image of the original document being conveyed through the curved conveyance path. The length detecting device detects a length of the original document. The operation device receives input of a user's instruction based on an operation of a user on the operation device. The controller includes a processor and accepts, through the operation device when the processor executes a control program, a first instruction for conveying the original document through the curved conveyance path, wherein upon acceptance of the first instruction, the controller allows the document conveyance device to convey the original document through the curved conveyance path when the length of the original document detected by the length detecting device is a value equal to or larger than the second interval or the controller disallows the document conveyance device to convey the original document through the curved conveyance path when the length of the original document detected by the length detecting device is a value smaller than the second interval.

An image forming apparatus according to another aspect of the present disclosure includes the above-described image reading device and an image forming device. The image forming device forms on a recording paper sheet the image of the original document read by the image reading device.

BRIEF DESCRIPTION OF THE DRAWINGS

FIG. 11 is a view showing examples of a message and a YES key.

FIG. 12 is a flowchart showing the control procedure of conveyance path selection assisting processing according to a third modification.

DETAILED DESCRIPTION

Hereinafter, a description will be given of an embodiment of the present disclosure with reference to the drawings.

Figure 1:
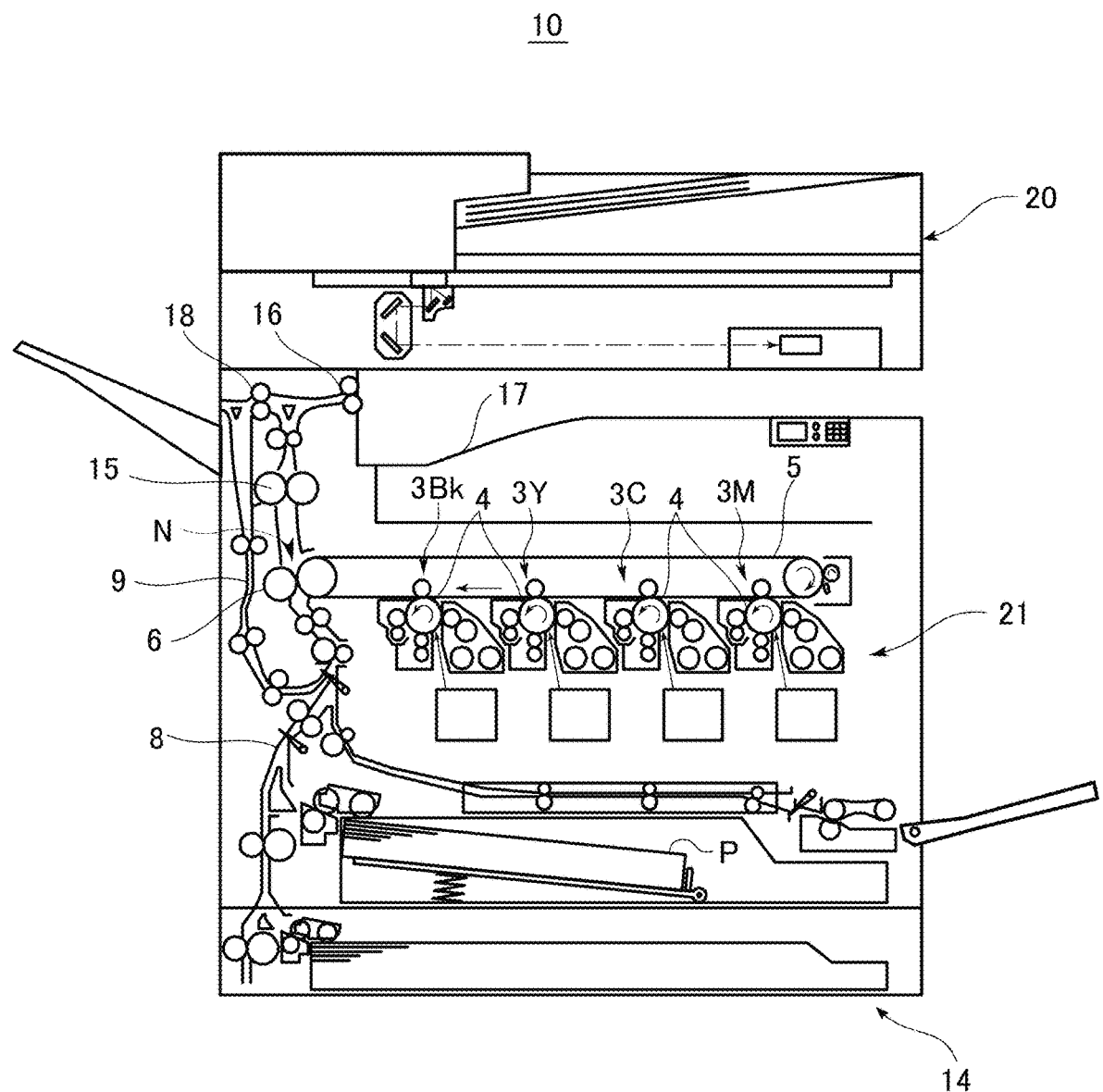
FIG. 1 is a cross-sectional view showing an image forming apparatus.

FIG. 1 is a cross-sectional view showing an image forming apparatus 10 according to one embodiment of the present disclosure. As shown in FIG. 1, the image forming apparatus 10 includes an image reading device 20 and an image forming device 21.

The image reading device 20 includes an image pickup element (for example, a CCD) capable of optically reading an image of an original document. The image reading device 20 converts an analog output of the image pickup element to a digital signal, thus generating image data representing the image of the original document.

The image forming device 21 prints on a recording paper sheet P an image represented by the image data. The image forming device 21 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. The multicolor toner image is secondarily transferred, at a nip region N between the intermediate transfer belt 5 and a secondary transfer roller 6, to a recording paper sheet P conveyed from a sheet feed device 14 via a first conveyance path 8.

A fixing device 15 applies heat and pressure to the recording paper sheet P to fix the toner image on the recording paper sheet P by heat and pressure. An ejection roller 16 ejects the recording paper sheet P to a sheet output tray 17.

In further recording an image of the original document on the back side of the recording paper sheet P, the image forming apparatus 10 performs switchback conveyance of the recording paper sheet P, in which the recording paper sheet P is conveyed to the ejection roller 10 located in front of the sheet output tray 17 and the ejection roller 16 is stopped and then reversely rotated. The image forming apparatus 10 returns the recording paper sheet P from the conveyance roller 18 via a second conveyance path 9 to the first conveyance path 8, thus turning over the recording paper sheet P. The image forming apparatus 10 allows the image forming device 21 to form the image of the original document on the back side of the recording paper sheet P and discharges the recording paper sheet P through the ejection roller 16 to the sheet output tray 17.

Figure 2:
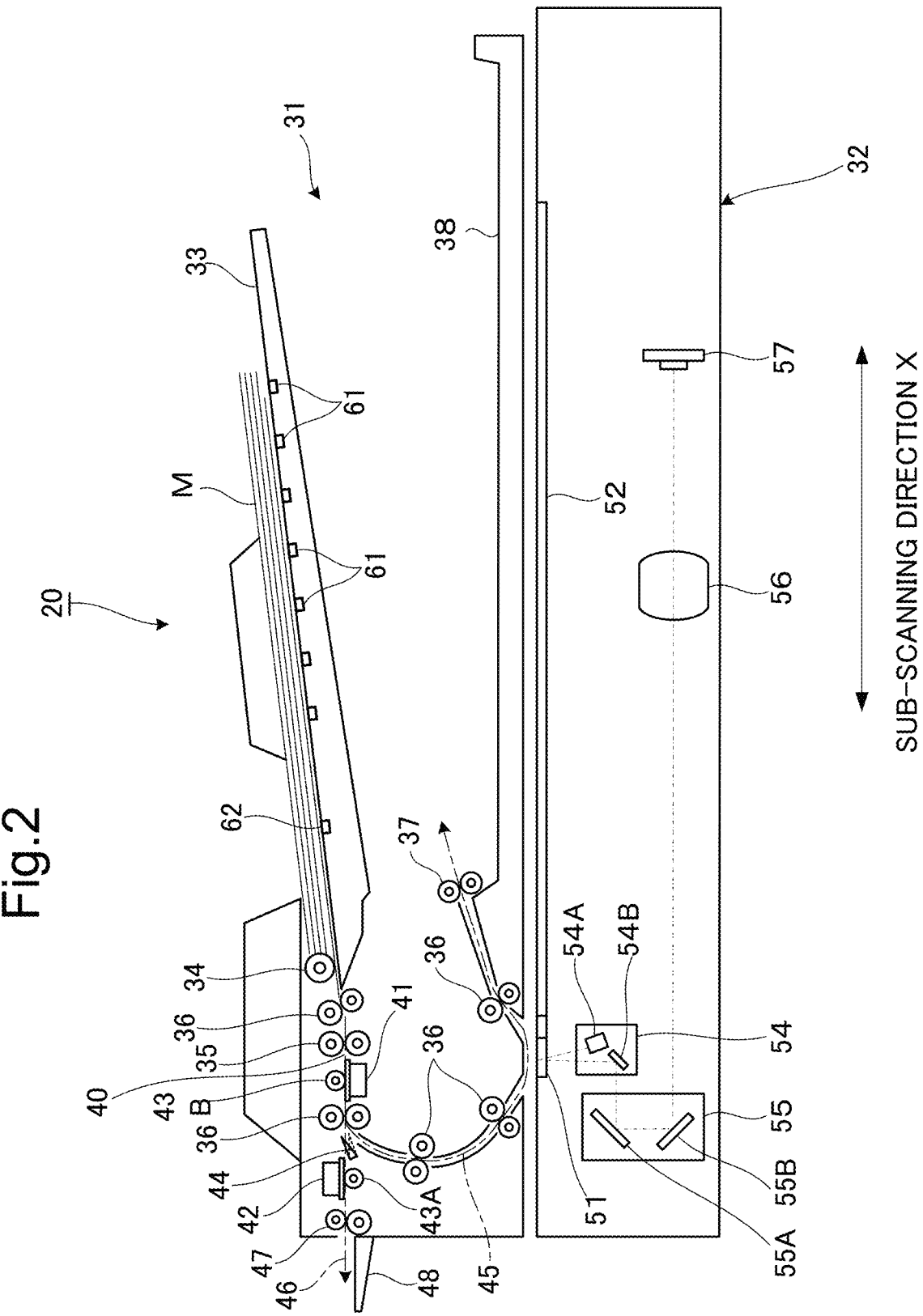
FIG. 2 is a cross-sectional view showing an image reading device.
Figure 3:
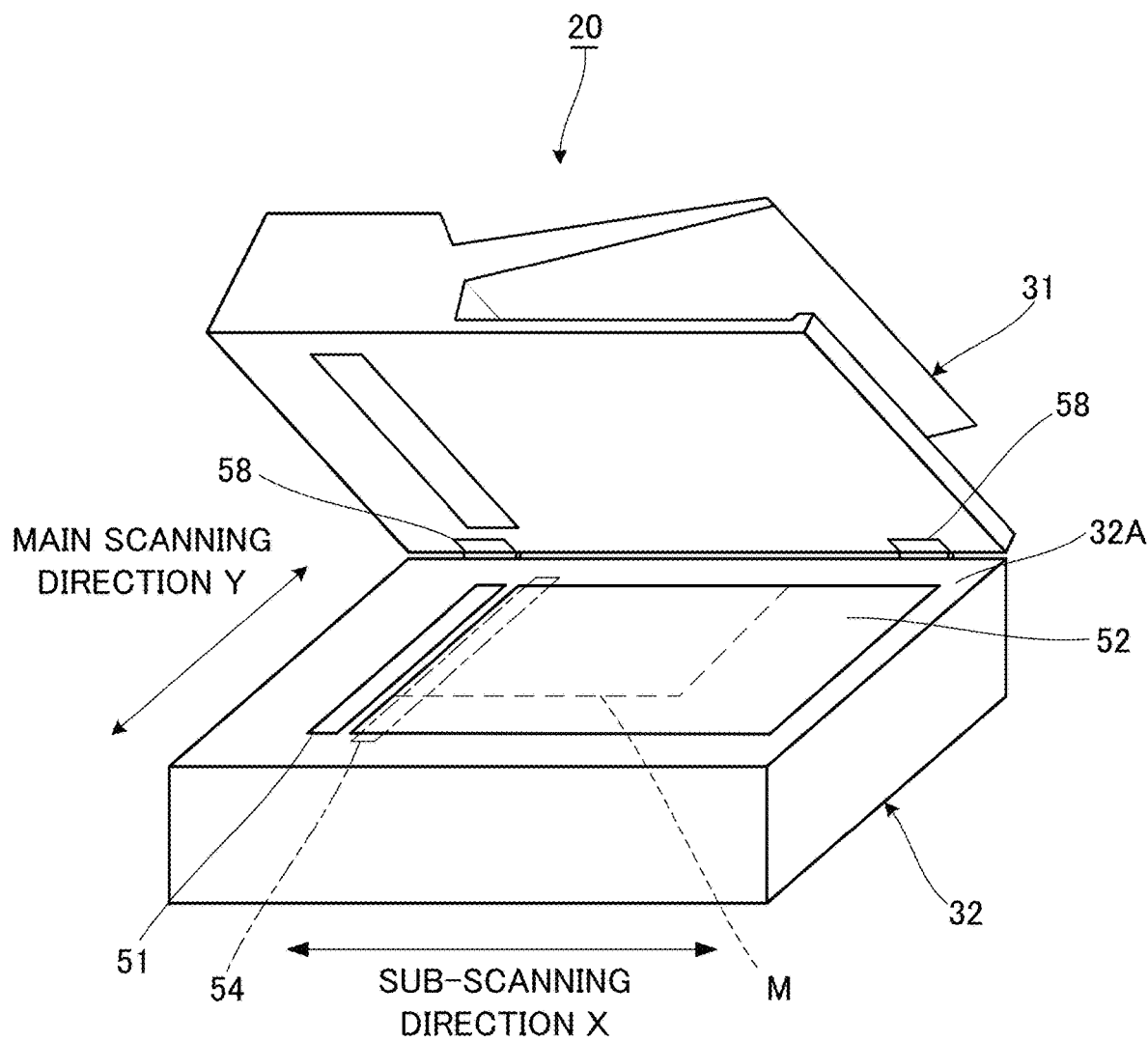
FIG. 3 is a perspective view showing the appearance of the image reading device.

Next a description will be given of the image reading device 20. FIG. 2 is a cross-sectional view showing the image reading device 20. FIG. 3 is a perspective view showing the appearance of the image reading device 20. FIG. 3 shows a state where the document conveyance device 31 is open.

As shown in FIGS. 2 and 3, the image reading device 20 includes the document conveyance device 31 and a scanning device 32. The document conveyance device 31 includes a document tray 33, a sheet feed roller 34, a registration roller 35, a plurality of conveyance rollers 36, a first sheet ejection roller 37, a first ejection tray 38, a first contact image sensor (hereinafter referred to as a "first CIS") 41, a second contact image sensor (hereinafter referred to as a "second CIS") 42, a second sheet ejection roller 47, a second ejection tray 48, and so on.

When in the document conveyance device 31 an original document M is placed on the document tray 33, the sheet feed roller 34 pulls out the original document M from the document tray 33. The original document M is conveyed in a basic conveyance path 40. The original document M is subsequently conveyed in a curved conveyance path 45 having a curved shape or a linear conveyance path 46 extending approximately linearly.

The curved conveyance path 45 is a conveyance path suitable for an original document M long in the direction of conveyance and made of a flexible thin sheet. The linear conveyance path 46 is a conveyance path suitable for an original document M short in the direction of conveyance and made of an inflexible cardboard material.

In the linear conveyance path 46, a shading roller 43A and the second sheet ejection roller 47 each serving as a conveyance roller for conveying the original document M are disposed at a predetermined first interval in the direction of document conveyance. Also, the sheet feed roller 34, the registration roller 35, a shading roller 43B, the conveyance roller 36, and the shading roller 43A are disposed at the first intervals in the direction of document conveyance. The shading roller 43A is opposed to the second CIS 42. The shading roller 43B is opposed to the first CIS 41.

In the curved conveyance path 45, the plurality of conveyance rollers 36 and the first sheet ejection roller 37 each serving as a conveyance roller for conveying the original document M are disposed at predetermined second intervals in the direction of document conveyance, each second interval being longer than the first interval.

The first intervals between the rollers are not necessarily equal so long as they are each smaller than the minimum of the second intervals. The second intervals between the rollers are not necessarily equal so long as they are each larger than the maximum of the first intervals.

A switching claw 44 is provided at a bifurcation point between the curved conveyance path 45 and the linear conveyance path 46. Under control of a controller 29 (see FIG. 4), an upstream end of the switching claw 44 in the direction of document conveyance is swung back and forth within a certain angular range by a rotary drive force of an actuator. As a result, the end of the switching claw 44 is oriented diagonally upward or horizontally in FIG. 2. When the end of the switching claw 44 is oriented diagonally upward, the original document M is conveyed through the curved conveyance path 45. When the end of the switching claw 44 is oriented horizontally, the original document M is conveyed through the linear conveyance path 46.

In the curved conveyance path 45, the original document M is conveyed from the registration roller 35 via between the first CIS 41 and the shading roller 43B. The original document M is guided downward by the switching claw 44 and conveyed to a first platen glass 51. The original document M passes above the first platen glass 51 and is ejected to the first ejection tray 38 by the first sheet ejection roller 37.

In the linear conveyance path 46, the original document M is conveyed from the registration roller 35 via between the first CIS 41 and the shading roller 43B. The original document M is guided horizontally by the switching claw 44 and conveyed via between the second CIS 42 and the shading roller 43A. The original document M is ejected to the second ejection tray 48 by the second sheet ejection roller 47.

The document tray 33 is provided with: a length sensor 61 for detecting the length of the original document M placed on the document tray 33; and a width sensor 62 for detecting the width of the original document M. The length sensor 61 comprises, for example, a plurality of optical sensors. The plurality of optical sensors are arranged spaced apart in the direction of document conveyance (the lengthwise direction of the original document M in this case) and embedded in the document tray 33. Each of the optical sensors includes a light-emitting element and a light-receiving element. When light emitted from the light-emitting element of the optical sensor is reflected by the original document M on the document tray 33, the reflected light is received by the light-receiving element of the optical sensor. The controller 29 determines the length of the original document M based on the locations of the light-receiving elements of all optical sensors having received the reflected light. For example, the controller 29 determines as the length of the original document M the distance from the location of the most upstream of these sensors to the location of the most downstream of these sensors in the direction of document conveyance.

Likewise, the width sensor 62 comprises, for example, a plurality of optical sensors. The plurality of optical sensors are arranged spaced apart in the widthwise direction of the original document M (the direction orthogonal to the direction of document conveyance in this case) and embedded in the document tray 33. When light emitted from the light-emitting element of each optical sensor is reflected by the original document M on the document tray 33, the reflected light is received by the light-receiving element of the optical sensor. The controller 29 determines the width of the original document M based on the locations of the light-receiving elements of all optical sensors having received the reflected light. For example, the controller 29 determines as the width of the original document M the distance from the location of the closest to one lateral end among these sensors to the location of the closest to the other lateral end among these sensors in the widthwise direction of the original document M.

The scanning device 32 includes a first platen glass 51, a second platen glass 52, a carriage 54, an optical system unit 55, a condenser lens 56, a CCD sensor 57, and so on.

In the scanning device 32, the carriage 54 includes: a light source 54A capable of irradiating an original document M with light; and a mirror 54B that reflects light reflected by the original document M. The optical system unit 55 includes a mirror 55A and a mirror 55B. The mirror 55A receives light reflected by the mirror 54B of the carriage 54 and turns the light approximately vertically downward. The mirror 55B turns the reflected light from the mirror 55A approximately horizontally and guides through the condenser lens 56 to the CCD sensor 57.

The carriage 54 and the optical system unit 55 are provided reciprocably movably along a rail in a sub-scanning direction orthogonal to a main scanning direction Y. The carriage 54 and the optical system unit 55 move in the sub-scanning direction X while maintaining a specified velocity relationship by a known drive mechanism including a stepping motor as a power source.

Two hinges 58 are provided spaced apart on an edge of a top surface 32A of the scanning device 32. These hinges 58 support the document conveyance device 31 to allow opening and closing of the document conveyance device 31. Thus, the user can perform opening and closing operations of the document conveyance device 31.

In the above structure, the controller 29 of the image reading device 20 selectively sets the image reading device 20 to a first mode for reading an image of an original document M placed on the second platen glass 52 or a second mode for reading an image of an original document M while conveying the original document M by the document conveyance device 31. The image reading device 20 includes, for example, a first sensor that detects an original document M placed on the second platen glass 52, and a second sensor that detects an original document M placed on the document tray 33 of the document conveyance device 31. When an original document M is detected by the first sensor, the controller 29 sets the image reading device 20 to the first mode. When an original document M is detected by the second sensor, the controller 29 sets the image reading device 20 to the second mode.

In the first mode, the user opens the document conveyance device 31 and places an original document M on the second platen glass 52 of the scanning device 32 with the second platen glass 52 open. The user then closes the document conveyance device 31 to hold the original document M on the second platen glass 52 against the document conveyance device 31. The controller 29 allows the scanning device 32 to irradiate the front side of the original document M through the second platen glass 52 with light of the light source 54A of the carriage 54 while moving the carriage 54 and the optical system unit 55 in the sub-scanning direction X with the specified velocity relationship maintained. Light reflected by the front side of the original document M is reflected by the mirror 54B of the carriage 54. The light reflected by the mirror 54B is reflected by the mirror 55A and mirror 55B of the optical system unit 55 and then enters the CCD sensor 57 via the condenser lens 56. The controller 29 allows the CCD sensor 57 to repeatedly read the image on the front side of the original document M in the main scanning direction Y (the direction orthogonal to the sub-scanning direction X).

In the second mode, the controller 29 allows the sheet feed roller 34 of the document conveyance device 31 in a closed position to pull out an original document M placed on the document tray 33 and convey the original document M through the curved conveyance path or the linear conveyance path 46.

In conveying the original document M through the curved conveyance path 45, the controller 29 allows the original document M to be conveyed from the registration roller 35 via between the first CIS 41 and the shading roller 43B in the manner described previously. The controller 29 then allows the original document M to be passed above the first platen glass 51 and ejected to the first ejection tray 38. The controller 29 allows the scanning device 32 to position the carriage 54 and the optical system unit 55 at their respective predetermined positions below the first platen glass 51 and irradiate the front side of the original document M through the first platen glass 51 with light of the light source 54A of the carriage 54. Light reflected by the front side of the original document M is reflected by the mirror 54B, the mirror 55A, and the mirror 55B and then enters the CCD sensor 57 via the condenser lens 56. The controller 29 allows the CCD sensor 57 to repeatedly read the image on the front side of the original document M in the main scanning direction Y.

In conveying the original document M through the linear conveyance path 46, the controller 29 allows the original document M to be conveyed from the registration roller 35 via between the first CIS 41 and the shading roller 43B in the manner described previously. The controller 29 then allows the original document M to be conveyed via between the second CIS 42 and the shading roller 43A and allows the second CIS 42 to read an image on the front side of the original document M.

When in the second mode scanning of both sides of the original document M is set, the controller 29 not only allows the scanning device 32 or the second CIS 42 to read the image on the front side of the original document M but also allows the first CIS 41 to read an image on the back side of the original document M.

Figure 4:
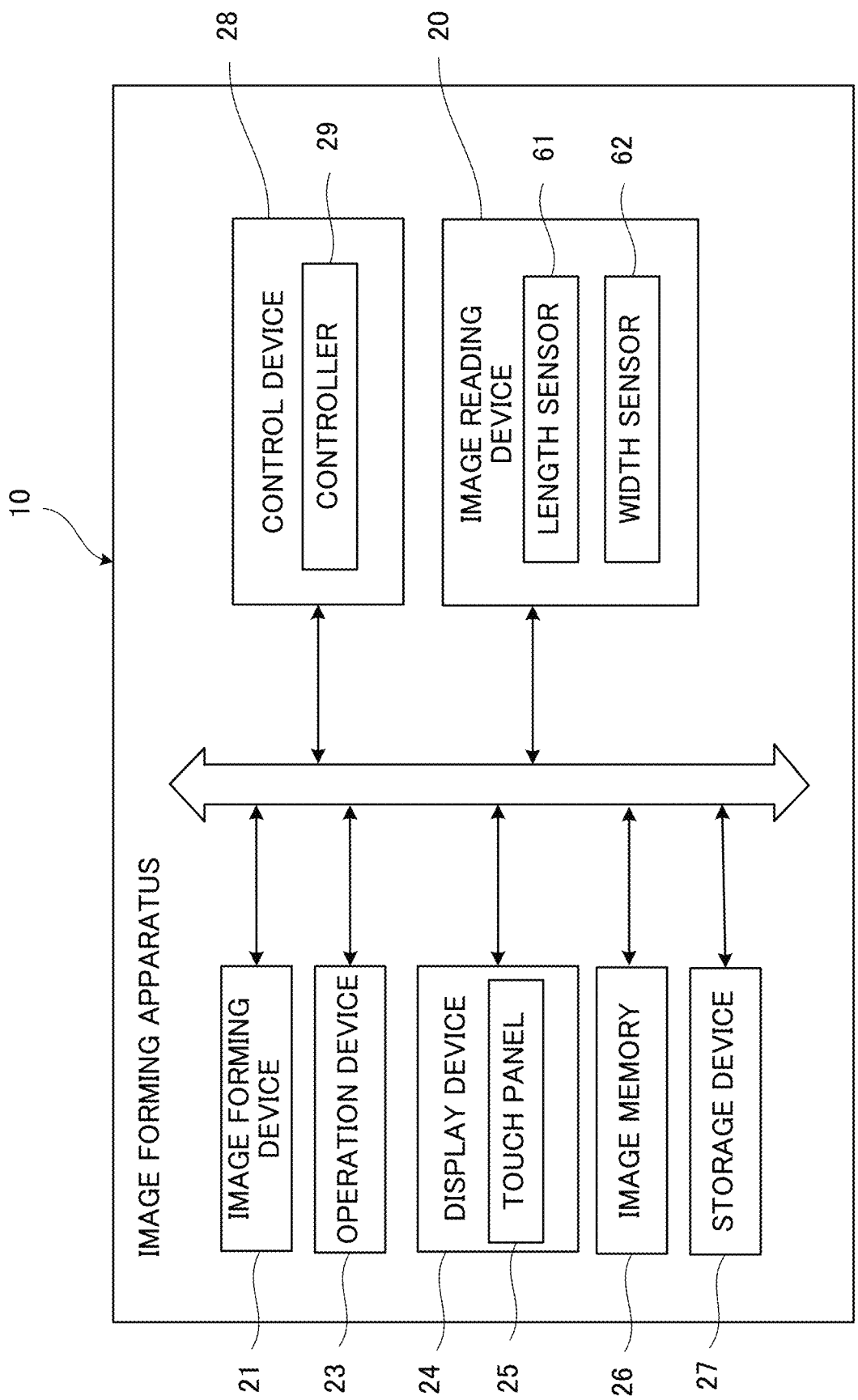
FIG. 4 is a block diagram showing an essential internal configuration of the image forming apparatus.

FIG. 4 is a block diagram showing an essential internal configuration of the image forming apparatus 10. As shown in FIG. 4, the image forming apparatus 10 includes the image reading device 20, the image forming device 21, an operation device 23, a display device 24, a touch panel 25, an image memory 26, a storage device 27, and a control device 28. These components are capable of data or signal transfer via a bus among them.

The operation device 23 includes physical keys, including numeric keys and an Enter key. The display device 24 is formed of a liquid crystal display (LCD), an organic EL (organic light-emitting diode (OLED)) display or the like. The operation device 23 accepts various instructions based on user's operations.

The touch panel 25 is disposed over the screen of the display device 24. The touch panel 25 is a touch panel of a resistive film system, a capacitance system or any other system. The touch panel 25 detects a touch on the touch panel 25 with a user's finger or the like, together with a point of the touch, and outputs a detection signal indicating the coordinate of the point of touch to the controller 29 of the control device 28.

The image memory 26 temporarily stores image data representing an image of an original document read by the image reading device 20.

The storage device 27 is a large storage device, such as an SSD (solid state drive) or an HDD (hard disk drive). The storage device 27 holds various types of application programs and various types of data.

The control device 28 is made up of a processor, a RAM (random access memory), a ROM (read only memory), and so on. The processor is, for example, a CPU (central processing unit), an ASIC (application specific integrated circuit) or an MPU (micro processing unit). When a control program stored in the ROM or the storage device 27 is executed by the above processor, the control device 28 functions as the controller 29.

The controller 29 provides overall control of the image forming apparatus 10. The control device 28 is connected to the image reading device 20, the image forming device 21, the operation device 23, the display device 24, the touch panel 25, the image memory 26, the storage device 27, and so on. The controller 29 performs operation control on each of the above components and signal or data transfer to and from each of the components.

The controller 29 serves as a processor that executes various types of processing necessary for image formation by the image forming apparatus 10. The controller 29 accepts an instruction for operation based on a detection signal output from the touch panel 25 or a user's operation on a physical key of the operation device 23. For example, the controller 29 accepts through the touch panel 25 a user's touch gesture on a GUI (graphical user interface) or the like being displayed on the screen of the display device 24. The controller 29 controls the display operation of the display device 24.

The document tray 33 of the image reading device 20 is provided with: the length sensor 61 for detecting the length of the original document M; and the width sensor 62 for detecting the width of the original document M. The controller 29 determines the length of the original document M in the direction of document conveyance based on a detection output of the length sensor 61. The controller 29 determines the width of the original document M in the direction orthogonal to the direction of document conveyance based on a detection output of the width sensor 62.

When in the image forming apparatus 10 the user places an original document M on the second platen glass 52 of the scanning device 32 of the image reading device 20, the first sensor detects the original document M placed on the second platen glass 52 and the controller 29 sets the image reading device 20 to the first mode and allows the image reading device 20 to operate in the first mode. When in the first mode the user operates the Start key and the operation device 23 accepts a document scanning instruction to scan an original document, the controller 29 follows the document scanning instruction to allow the scanning device 32 to read an image of the original document M on the second platen glass 52 and allow the image memory 26 to store image data representing the image of the original document M. The controller 29 allows the image forming device 21 to form on a recording paper sheet P the image of the original document M represented by the image data.

On the other hand, when the user places an original document M on the document tray 33 of the document conveyance device 31 of the image reading device 20, the second sensor detects the original document M placed on the document tray 33 and the controller 29 sets the image reading device 20 to the second mode and allows the image reading device 20 to operate in the second mode. In the second mode, for example, the user touches a GUI displayed on the display device 24 to input to the operation device 23 a selection instruction for selecting one of the curved conveyance path 45 and the linear conveyance path 46. In doing so, when the original document M has a certain degree of length and is made of a flexible thin sheet, the user inputs a selection instruction to select the curved conveyance path 45. On the other hand, when the original document M is relatively short and is made of an inflexible cardboard material, the user inputs a selection instruction to select the linear conveyance path 46. The controller 29 determines which of the curved conveyance path 45 and the linear conveyance path 46 is the selection indicated by the selection instruction accepted by the operation device 23.

Subsequently, when the user operates the Start key and the operation device 23 thus accepts a document scanning instruction, the controller 29 allows the document conveyance device 31 of the image reading device 20 to pull out the original document M from the document tray 33 and convey the original document M through the curved conveyance path 45 or the linear conveyance path 46 indicated by the selection instruction. In allowing the original document M to be conveyed through the curved conveyance path 45, the controller 29 allows the CCD sensor 57 of the scanning device 32 to read an image on the front side of the original document M and allows the image memory 26 to store image data representing the image on the front side of the original document M. The controller 29 allows the image forming device 21 to form on a recording paper sheet P the image on the front side of the original document M represented by the image data. In allowing the original document M to be conveyed through the linear conveyance path 46, the controller 29 allows the second CIS 42 to read an image on the front side of the original document M and allows the image memory 26 to store image data representing the image on the front side of the original document M. The controller 29 allows the image forming device 21 to form on a recording paper sheet P the image on the front side of the original document M represented by the image data.

Alternatively, when the operation device 23 accepts, by user's touch gestures on the GUI displayed on the display device 24, a selection instruction to select the curved conveyance path 45 and a both-side scanning instruction to scan both sides of the original document M, the controller 29 allows the original document M to be conveyed through the curved conveyance path 45, allows the first CIS 41 to read an image on the back side of the original document M, and allows the CCD sensor 57 of the scanning device 32 to read an image on the front side of the original document M. The controller 29 then allows the image memory 26 to sequentially store image data representing the image on the back side of the original document M and image data representing the image on the front side of the original document M. The controller 29 allows the image forming device 21 to form the images on the front side and back side of the original document M each represented by image data on the front side and back side, respectively, of a recording paper sheet P.

Still alternatively, when the operation device 23 accepts, by user's touch gestures on the GUI displayed on the display device 24, a selection instruction to select the linear conveyance path 46 and a both-side scanning instruction to scan both sides of the original document M, the controller 29 allows the original document M to be conveyed through the linear conveyance path 46, allows the first CIS 41 to read an image on the back side of the original document M, and allows the second CIS 42 to read an image on the front side of the original document M. The controller 29 then allows the image memory 26 to sequentially store image data representing the image on the back side of the original document M and image data representing the image on the front side of the original document M and allows the image forming device 21 to form the images on the front side and back side of the original document M each represented by image data on the front side and back side, respectively, of a recording paper sheet P.

If the user does not appropriately select the curved conveyance path 45 or the linear conveyance path 46 according to the length of the original document M, various troubles will occur. For example, if an original document M made of a sheet of paper short in the direction of document conveyance, such as a business card or another type of card, is conveyed through the curved conveyance path 45, a sheet jam may occur or the original document M may be folded.

To cope with the above problem, in this embodiment, the existing length sensor 61 provided in the document tray 33 is used to assist the selection of the curved conveyance path 45 or the linear conveyance path 46 suitable to convey the original document M, based on the length of the original document M detected by the length sensor 61.

Next, a description will be given of conveyance path selection assisting processing for assisting the selection of the curved conveyance path 45 or the linear conveyance path 46 suitable to convey an original document M based on the length of the original document M detected by the length sensor 61, with reference to the flowchart shown in FIG. 5 and other references.

When the user places an original document M on the document tray 33, the second sensor detects the original document M on the document tray 33. The controller 29 sets the image reading device 20 to the second mode based on a detection output of the second sensor (step S101). The controller 29 determines the length of the original document M based on a detection output of the length sensor 61 and determines the width of the original document M based on a detection output of the width sensor 62, thus determining the size of the original document M (step S102). For example, the controller 29 determines whether or not the size of recording paper sheets P loaded in the sheet feed device 14 fits in with the determined size of the original document M. When determining that the size of the recording paper sheets P does not fit in with the size of the original document M, the controller 29 allows the display device 24 to display an alarm message, for example, a message prompting to change the recording paper sheets P loaded in the sheet feed device 14.

Figure 6:
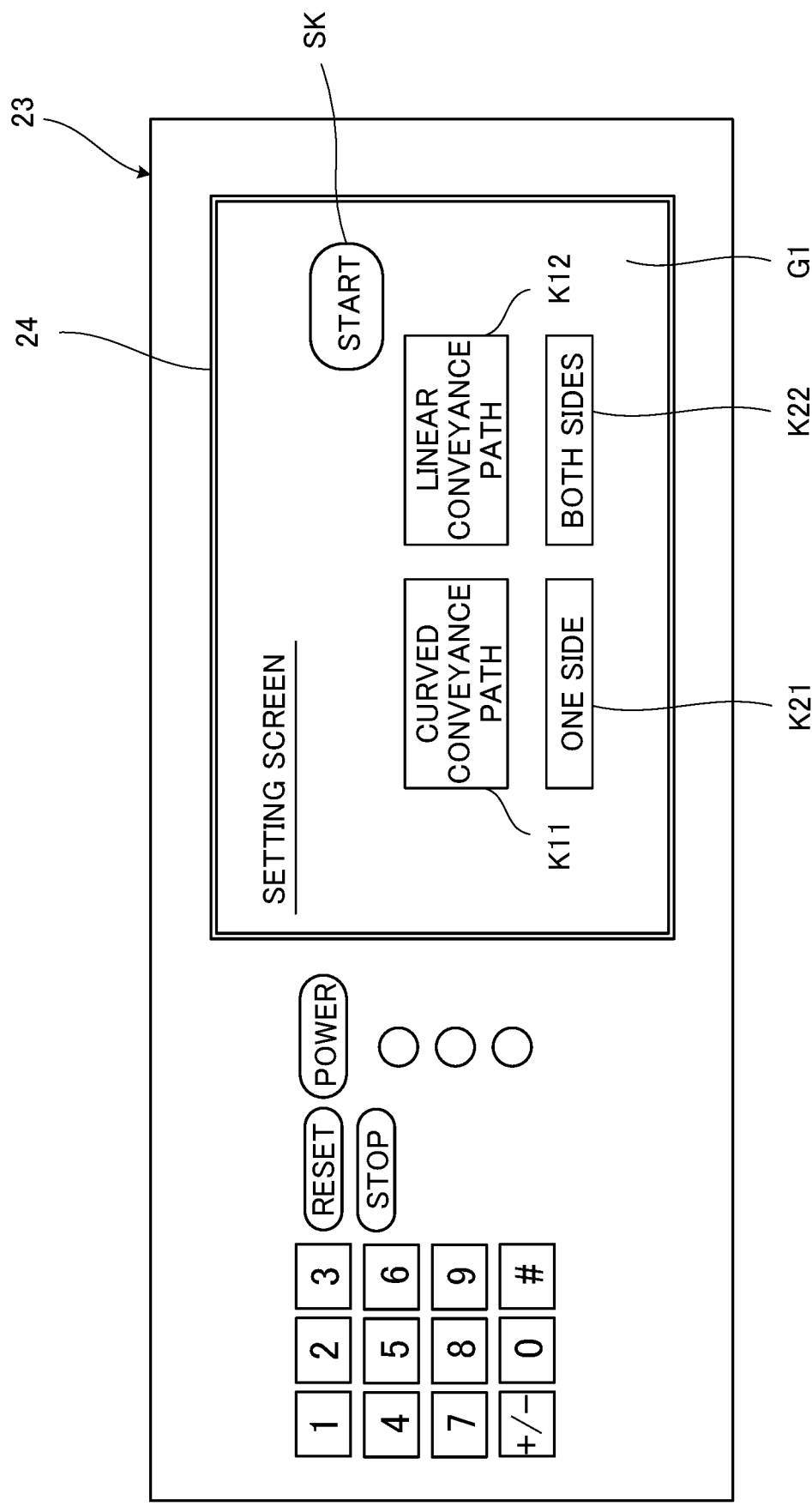
FIG. 6 is a view showing an example of a setting screen.

Subsequently, the controller 29 allows the display device 24 to display a setting screen (an example of a GUI) G1 shown in FIG. 6 (step S103). The setting screen G1 is a screen for use in allowing the user to input a selection instruction to select the curved conveyance path 45 or the linear conveyance path 46 and a selection instruction to select one-side scanning or both-side scanning in scanning the original document M. The controller 29 allows the display device 24 to display on the setting screen G1 a key K11 for use in selecting the curved conveyance path 45, a key K12 for use in selecting the linear conveyance path 46, a key K21 for use in selecting one-side scanning of the original document M, a key K22 for use in selecting both-side scanning of the original document M, and a Start key SK.

The user touches one of the keys K11 and K12 on the setting screen G1 to input a selection instruction to select the curved conveyance path 45 or the linear conveyance path 46 and touches one of the keys K21 and K22 on the setting screen G1 to input a selection instruction to select one-side scanning or both-side scanning of the original document M.

The controller 29 determines the selection of the curved conveyance path 45 or the linear conveyance path 46 based on the contents of the instruction input according to the touch gesture on one of the keys K11 and K12 on the setting screen G1, and determines the selection of one-side scanning or both-side scanning of the original document M based on the contents of the instruction input according to the touch gesture on one of the keys K21 and K22 (step S104).

Subsequently, the user touches the Start key SK on the setting screen G1. Based on the instruction accepted by the operation device 23 based on the touch gesture on the Start key SK, the controller 29 determines whether or not the curved conveyance path 45 is selected (step S105). When the curved conveyance path 45 is not selected ("No" in step S105), i.e., when the linear conveyance path 46 is selected, the controller 29 allows the original document M to be conveyed through the linear conveyance path 46 (step S106).

In doing so, when one-side scanning of the original document M is selected, the controller 29 allows the second CIS 42 to read an image on the front side of the original document M and allows the image forming device 21 to form the image on the front side of the original document M on a recording paper sheet P. When both-side scanning of the original document M is selected, the controller 29 allows the first CIS 41 to read an image on the back side of the original document M, allows the second CIS 42 to read an image on the front side of the original document M, and allows the image forming device 21 to form the image on the front side of the original document M and the image on the back side of the original document M on the front side and the back side, respectively, of a recording paper sheet P (step S107).

On the other hand, when the curved conveyance path 45 is selected ("Yes" in step S105), the controller 29 determines whether or not the length of the original document M determined in step S102 is equal to or larger than a predetermined threshold S which is a value equal to or larger than the second interval described previously (step S108).

When the length of the original document M determined in step S102 is equal to or larger than the threshold S ("Yes" in step S108), the controller 29 allows the original document M to be conveyed through the curved conveyance path 45 (step S109). Assume that the controller 29 sets the threshold S at a value smaller than the lengths of standard size documents, including A5, B5, A4, and B4, in the direction of document conveyance. In this case, the original document M is of a standard size, such as A5, B5, A4 or B4.

When one-side scanning of the original document M is selected, the controller 29 allows the CCD sensor 57 of the scanning device 32 to read an image on the front side of the original document M and allows the image forming device 21 to form the image on the front side of the original document M on a recording paper sheet P. When both-side scanning of the original document M is selected, the controller 29 allows the first CIS 41 to read an image on the back side of the original document M and allows the CCD sensor 57 of the scanning device 32 to read an image on the front side of the original document M. The controller 29 allows the image forming device 21 to form the images on the front side and back side of the original document M on the front side and back side, respectively, of a recording paper sheet P (step S110).

Figure 7:
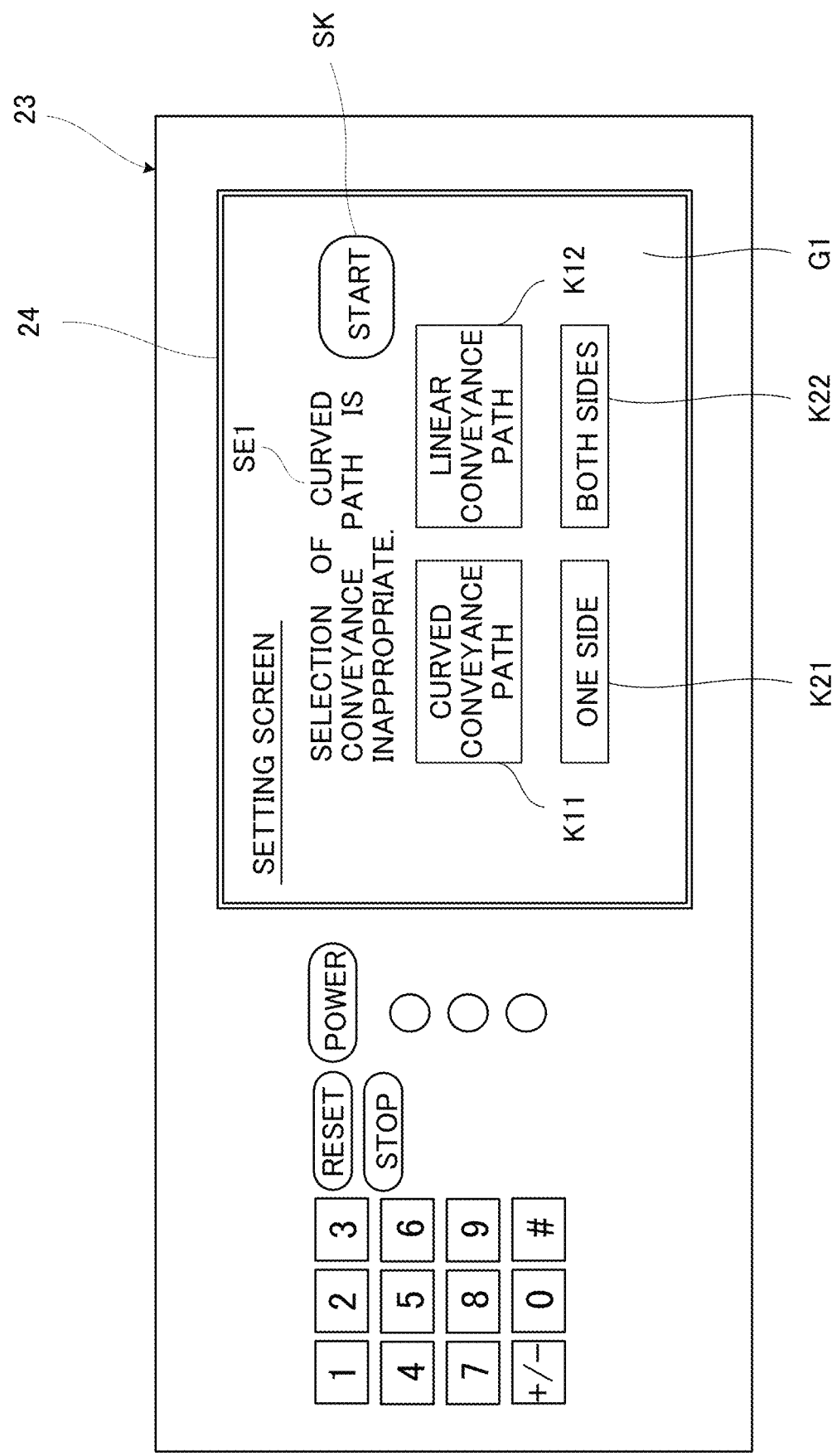
FIG. 7 is a view showing an example of a message.

When the length of the original document M determined in step S102 is smaller than the threshold S ("No" in step S108), i.e., when the original document M is an relatively small document, such as a business card or another type of card, the controller 29 disallows the conveyance of the original document M through the curved conveyance path 45 and, as shown in FIG. 7, allows the display device 24 to display on the setting screen G1 a message SE1 indicating that the selection of the curved conveyance path 45 is inappropriate (step S111). After the processing in step S111, the controller 29 goes back to the processing in step S104 and waits for any instruction to be input to the operation device 23 by another touch gesture on the setting screen G1.

Upon seeing the message SE1, the user makes touch gestures on the setting screen G1 again to input to the operation device 23 a selection instruction to select the linear conveyance path 46 and a document scanning instruction. Thus, when the selection of the linear conveyance path 46 is determined (step S104) and the curved conveyance path 45 is not selected ("No" in step S105), the controller 29 allows the original document M to be conveyed through the linear conveyance path 46 (step S106).

The controller 29 allows the second CIS 42 to read an image on the front side of the original document M and allows the image forming device 21 to form the image on the front side of the original document M on a recording paper sheet P, or alternatively allows the first CIS 41 to read an image on the back side of the original document M, allows the second CIS 42 to read an image on the front side of the original document M, and allows the image forming device 21 to form the image on the front side of the original document M and the image on the back side of the original document M on the front side and the back side, respectively, of a recording paper sheet P (step S107). Thus, a sheet jam, folding of the original document M, and so on can be prevented.

In the general image reading device described previously, light having passed through an original document is received by the light-receiving part, the thickness of the original document is determined based on the amount of light received by the light-receiving part, and conveyance paths are switched according to the determined thickness. Therefore, when even thin original documents are conveyed in an overlapped manner, the amount of light received by the light-receiving part decreases and, thus, the thickness of the original document is determined to be equal to or larger than the predetermined thickness, leading to an incorrect determination of the thickness of the original document. Not only the thickness of the original document but also the print condition of the original document changes the amount of light passing through the original document to change the amount of light received by the light-receiving part, which may incorrectly determine the thickness of the original document. If the thickness of the original document is incorrectly determined, the curved conveyance path or the linear conveyance path through one of which the original document should be conveyed cannot appropriately be selected. Furthermore, the provision of the light-emitting part and the light-receiving part for the purpose of determining the thickness of the original document results in an increased number of parts and an increased cost. In addition, the general image reading device described previously cannot address the case where the length of an original document in the direction of document conveyance is short and, therefore, the original document cannot properly be conveyed through the curved conveyance path.

Unlike the above, in this embodiment, when the curved conveyance path 45 is selected but it is difficult to convey an original document M, such as a business card or other types of cards, through the curved conveyance path 45, a message SE1 indicating that the selection of the curved conveyance path 45 is inappropriate is displayed on the display device 24, thus prompting the user to select the linear conveyance path 46. As a result, a sheet jam, folding of the original document M and so on can be prevented. In other words, in this embodiment, aside from the detection of conveyance in an overlapped manner, it is possible to assist an appropriate selection of the curved conveyance path 45 or the linear conveyance path 46 through which the original document M is to be properly conveyed, based on the length of the original document M detected by the existing detection device.

<First Modification>

Figure 8:
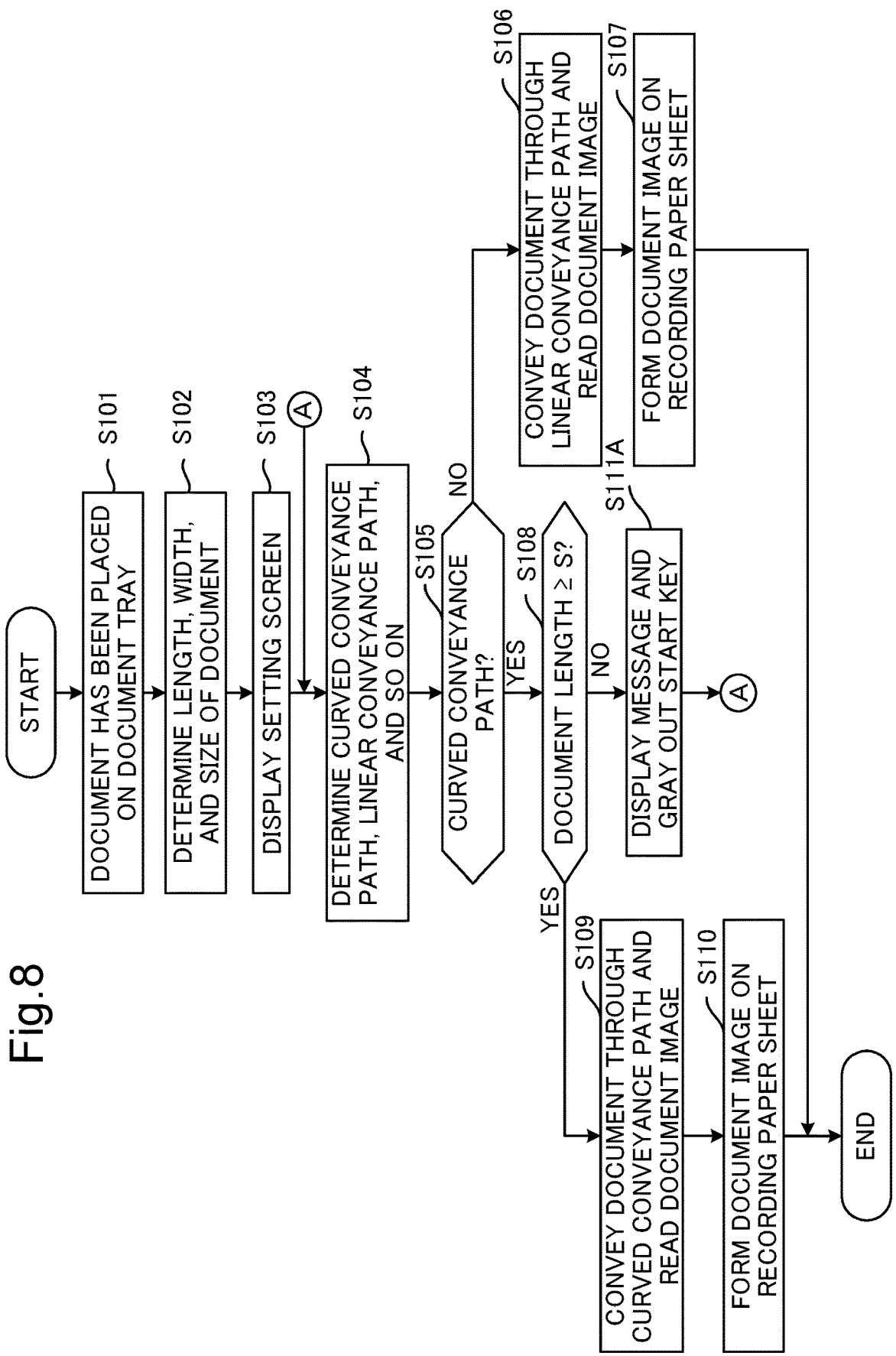
FIG. 8 is a flowchart showing the control procedure of conveyance path selection assisting processing according to a first modification.

FIG. 8 is a flowchart showing the control procedure of conveyance path selection assisting processing according to a first modification. In the flowchart shown in FIG. 8, the same processing steps as in the flowchart shown in FIG. 5 are designated by the same references and further explanation thereof will be omitted.

Figure 9:
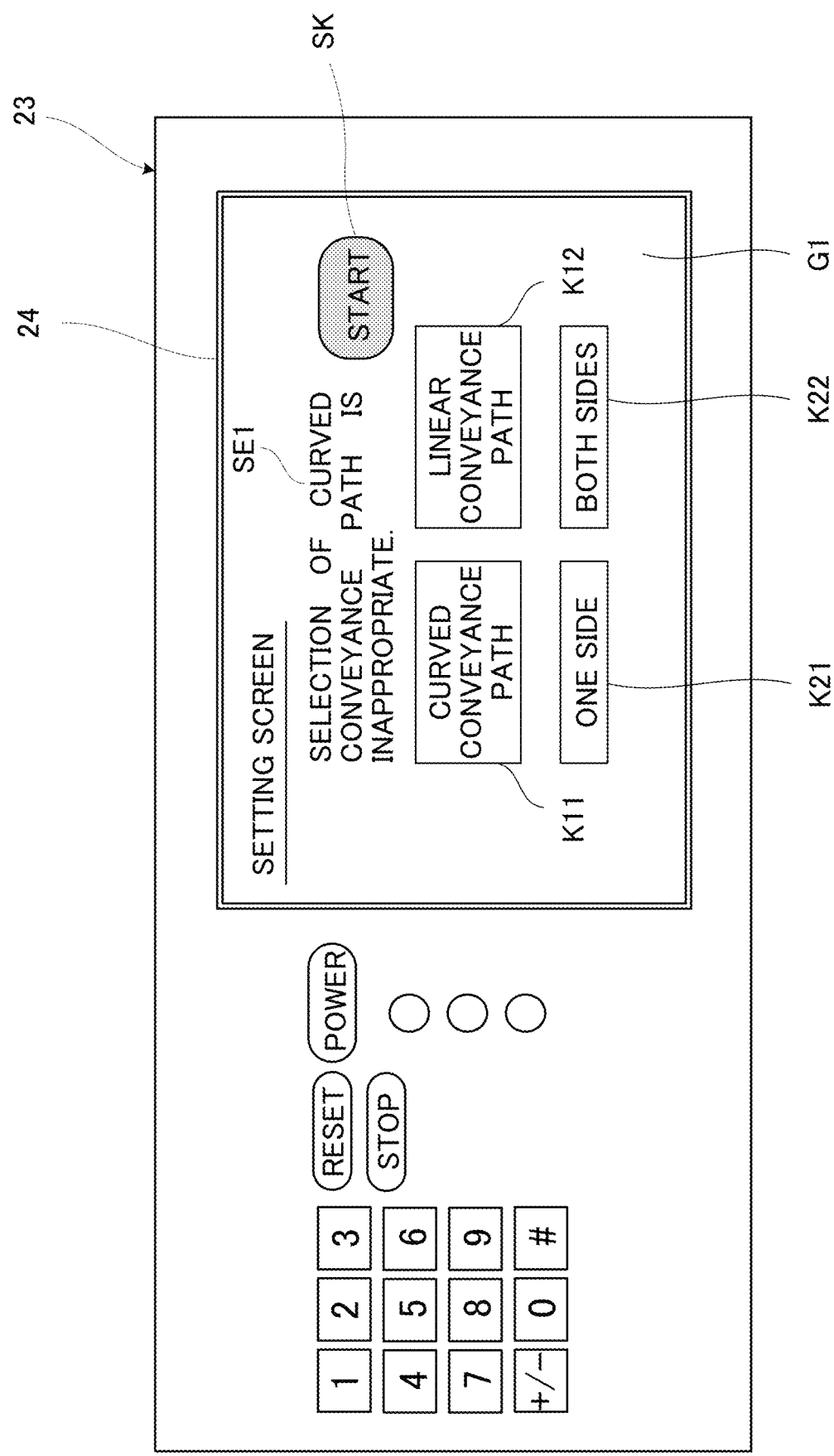
FIG. 9 is a view showing examples of a message and a grayed-out Start key.

In the first modification, when, although the user selects the curved conveyance path 45 (step S104) and the selection of the curved conveyance path 45 is determined ("Yes" in step S105), the length of the original document M determined in step S102 is smaller than the threshold S ("No" in step S108), i.e., the original document M is a business card or another type of card, the controller 29 disallows the conveyance of the original document M through the curved conveyance path 45 and, as shown in FIG. 9, allows the display device 24 to display on the setting screen G1 a message SE1 indicating the selection of the curved conveyance path 45 is inappropriate and gray out the Start key SK on the setting screen G1 (step S111A). The controller 29 disables touch gestures which may be made on the Start key SK and keeps from accepting through the touch panel 25 any instruction based on a touch gesture on the Start key SK. After the processing in step S111A, the controller 29 goes back to the processing in step S104 and waits for any instruction to be input by another touch gesture on the setting screen G1.

Upon seeing the message SE1, the user touches the key K12 on the setting screen G1 to select the linear conveyance path 46. When the controller 29 determines, based on the touch gesture on the key K12, that the operation device 23 has accepted a selection instruction to select the linear conveyance path 46 (step S104), it allows the display device 24 to stop the gray-out of the Start key SK and normally display the Start key SK, thus making the operation device 23 ready to accept a document scanning instruction based on a touch gesture on the Start key SK through the touch panel 25.

Then, the operation device 23 accepts the document scanning instruction based on a user's touch gesture on the Start key SK. Since in this case the curved conveyance path 45 is not selected ("No" in step S105), the controller 29 allows the original document M to be conveyed through the linear conveyance path 46 (step S106). The controller 29 allows the second CIS 42 to read an image on the front side of the original document M and allows the image forming device 21 to form the image on the front side of the original document M on a recording paper sheet P, or alternatively allows the first CIS 41 to read an image on the back side of the original document M, allows the second CIS 42 to read an image on the front side of the original document M, and allows the image forming device 21 to form the image on the front side of the original document M and the image on the back side of the original document M on the front side and the back side, respectively, of a recording paper sheet P (step S107). Thus, a sheet jam, folding of the original document M, and so on can be prevented.

<Second Modification>

Figure 10:
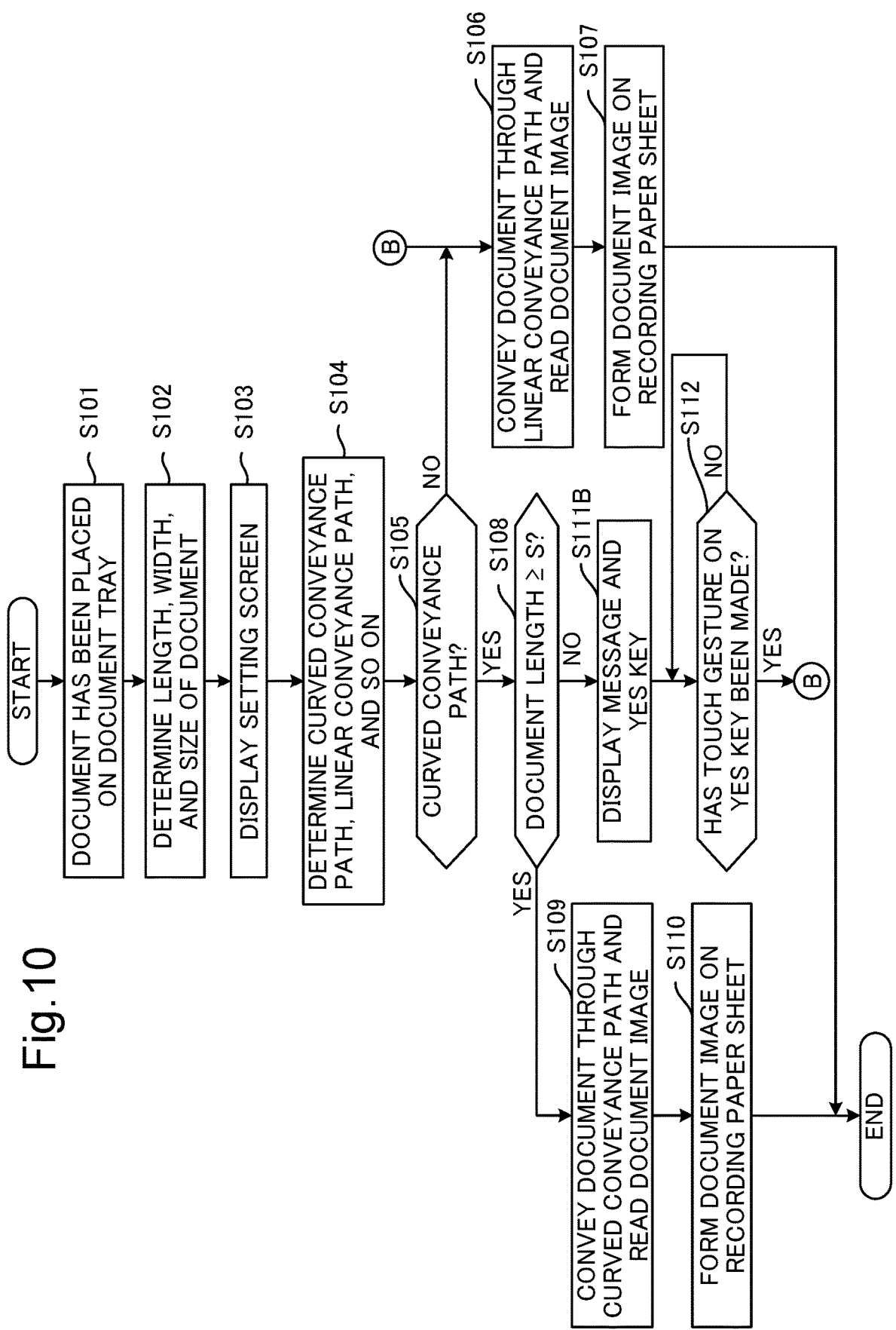
FIG. 10 is a flowchart showing the control procedure of conveyance path selection assisting processing according to a second modification.

FIG. 10 is a flowchart showing the control procedure of conveyance path selection assisting processing according to a second modification. In the flowchart shown in FIG. 10, the same processing steps as in the flowchart shown in FIG. 5 are designated by the same references and further explanation thereof will be omitted.

In the second modification, when, although the user selects the curved conveyance path 45 (step S104) and the selection of the curved conveyance path 45 is determined ("Yes" in step S105), the length of the original document M determined in step S102 is smaller than the threshold S ("No" in step S108), i.e., the original document M is a business card or another type of card, the controller 29 disallows the conveyance of the original document M through the curved conveyance path 45 and, as shown in FIG. 11, allows the display device 24 to display on the setting screen G1 a message SE2 prompting to select the linear conveyance path 46 and the YES key K31 (step S111B) and waits for a touch gesture on the YES key K31 ("No" in step S112).

When the user sees the message SE2 and touches the YES key K31 on the setting screen G1, the controller 29 selects the linear conveyance path 46 based on the touch gesture. When detecting that the operation device 23 has accepted a document scanning instruction based on the touch gesture on the YES key K31 ("Yes" in step S112), the controller 29 allows the original document M to be conveyed through the linear conveyance path 46 (step S106). The controller 29 allows the second CIS 42 to read an image on the front side of the original document M and allows the image forming device 21 to form the image on the front side of the original document M on a recording paper sheet P, or alternatively allows the first CIS 41 to read an image on the back side of the original document M, allows the second CIS 42 to read an image on the front side of the original document M, and allows the image forming device 21 to form the image on the front side of the original document M and the image on the back side of the original document M on the front side and the back side, respectively, of a recording paper sheet P (step S107). Thus, a sheet jam, folding of the original document M, and so on can be prevented.

<Third Modification>

FIG. 12 is a flowchart showing the control procedure of conveyance path selection assisting processing according to a third modification. In the flowchart shown in FIG. 12, the same processing steps as in the flowchart shown in FIG. 5 are designated by the same references and further explanation thereof will be omitted.

In the third modification, when, although the user selects the curved conveyance path 45 (step S104) and the selection of the curved conveyance path 45 is determined ("Yes" in step S105), the length of the original document M determined in step S102 is smaller than the threshold S ("No" in step S108), i.e., the original document M is a business card or another type of card, the controller 29 disallows the conveyance of the original document M through the curved conveyance path 45 and selects the linear conveyance path 46 (step S113).

The controller 29 allows the original document M to be conveyed through the linear conveyance path 46 (step S106), allows the second CIS 42 to read an image on the front side of the original document M, and allows the image forming device 21 to form the image on the front side of the original document M on a recording paper sheet P. Alternatively, the controller 29 allows the original document M to be conveyed through the linear conveyance path 46 (step S106), allows the first CIS 41 to read an image on the back side of the original document M, allows the second CIS 42 to read an image on the front side of the original document M, and allows the image forming device 21 to form the image on the front side of the original document M and the image on the back side of the original document M on the front side and the back side, respectively, of a recording paper sheet P (step S107). Thus, a sheet jam, folding of the original document M, and so on can be prevented.

<Other Modifications>

When, in the sequences of processing steps shown in FIGS. 5, 8, 10, and 12 in the above embodiment, the controller 29 determines that the length of the original document M determined in step S102 is smaller than a value indicating the first interval described previously, the controller 29 may disallow the conveyance of the original document M through the linear conveyance path 46 and the curved conveyance path 45. In other words, in this case, the controller 29 keeps the image reading device 20 from scanning the original document M. Thus, it can be avoided that any original document M having a length making even conveyance through the linear conveyance path 46 difficult is conveyed through the linear conveyance path 46 and a sheet jam or other troubles thus occur.

Furthermore, when, in the sequences of processing steps shown in FIGS. 5, 8, 10, and 12 in the above embodiment, the controller 29 determines, in step S108, the document size of the original document M based on the length and width of the original document M determined in step S102 and the determined document size is a predetermined first size (a standard size, such as A5, B5, A4 or B4) conveyable through the curved conveyance path 45, the controller 29 may go to the processing in step S109 and allow the original document M to be conveyed through the curved conveyance path 45.

Figure 5:
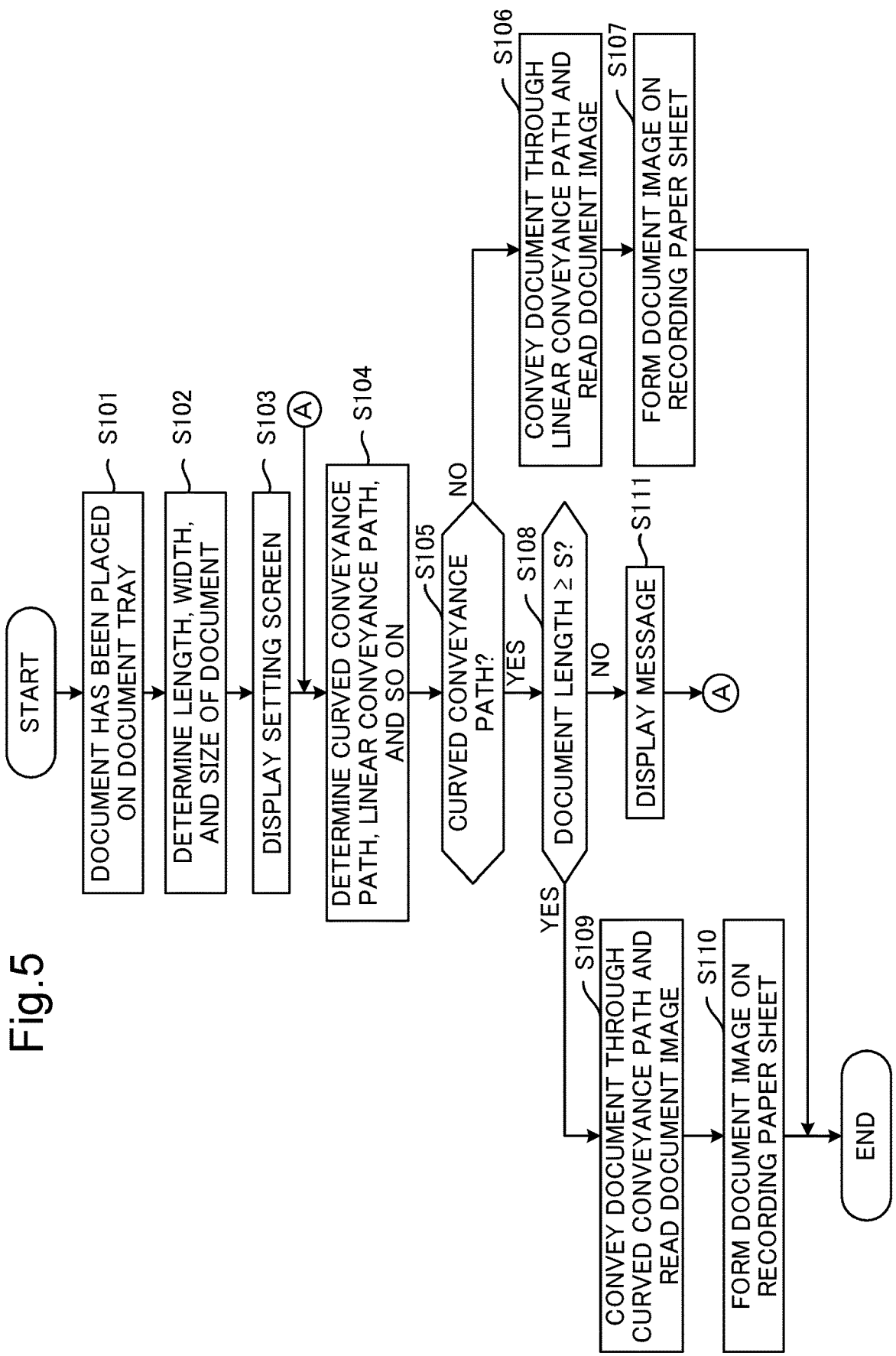
FIG. 5 is a flowchart showing the control procedure of conveyance path selection assisting processing.

On the other hand, when the determined document size is a predetermined second size (such as a standard business card size or a standard credit card size) not conveyable through the curved conveyance path 45, the controller 29 may go to step S111 in the processing procedure in FIG. 5, step S111A in the processing procedure in FIG. 8, step S111B in the processing procedure in FIG. 10, and step S113 in the processing procedure in FIG. 12.

The present disclosure is not limited to the structures and configurations in the above embodiment and various modifications can be made thereto. The structures, configurations, and processing described in the above embodiment with reference to FIGS. 1 to 12 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image reading device comprising:
   a document tray;
   a linear conveyance path extending approximately linearly in which a plurality of conveyance rollers capable of conveying an original document are disposed at a predetermined first interval;
   a curved conveyance path in which a plurality of conveyance rollers capable of conveying an original document are disposed at a predetermined second interval longer than the first interval;
   a document conveyance device that pulls out the original document placed on the document tray from the document tray and conveys the pulled original document through one of the linear conveyance path and the curved conveyance path;
   a scanning device that reads an image of the original document being conveyed through the linear conveyance path and an image of the original document being conveyed through the curved conveyance path;
   a length detecting device that detects a length of the original document;
   an operation device that receives input of a user's instruction based on an operation of a user on the operation device; and
   a controller that includes a processor and accepts, through the operation device when the processor executes a control program, a first instruction for conveying the original document through the curved conveyance path, wherein upon acceptance of the first instruction, the controller allows the document conveyance device to convey the original document through the curved conveyance path when the length of the original document detected by the length detecting device is a value equal to or larger than the second interval or the controller disallows the document conveyance device to convey the original document through the curved conveyance path when the length of the original document detected by the length detecting device is a value smaller than the second interval.

2. The image reading device according to claim 1, further comprising a display device, wherein in disallowing the document conveyance device to convey the original document through the curved conveyance path, the controller allows the display device to display a message prompting to input, by an operation on the operation device, a second instruction for conveying the original document through the linear conveyance path.

3. The image reading device according to claim 2, wherein when accepting the second instruction through the operation device, the controller allows the document conveyance device to convey the original document through the linear conveyance path and allows the scanning device to read an image of the original document being conveyed through the linear conveyance path.

4. The image reading device according to claim 1, wherein in disallowing the document conveyance device to convey the original document through the curved conveyance path, the controller allows the document conveyance device to convey the original document through the linear conveyance path and allows the scanning device to read an image of the original document being conveyed through the linear conveyance path.

5. The image reading device according to claim 1, wherein when the length of the original document detected by the length detecting device is a value smaller than the first interval, the controller disallows the document conveyance device to convey the original document through the linear conveyance path and the curved conveyance path.

6. The image reading device according to claim 1, further comprising a width detecting device that detects a width of the original document, wherein the controller performs, instead of first switching processing for allowing or disallowing conveyance of the original document through the curved conveyance path depending on whether or not the length of the original document detected by the length detecting device is a value equal to or larger than the second interval, second switching processing for determining a size of the original document based on the length of the original document detected by the length detecting device and the width of the original document detected by the width detecting device and allowing the document conveyance device to convey the original document through the curved conveyance path when the determined size of the original document is a predetermined first size capable of being conveyed through the curved conveyance path, or disallowing the document conveyance device to convey the original document through the curved conveyance path when the determined size of the original document is a predetermined second size incapable of being conveyed through the curved conveyance path.

7. The image reading device according to claim 1, further comprising a display device, wherein in disallowing the document conveyance device to convey the original document through the curved conveyance path, the controller allows the display device to display a message indicating that the selection of the curved conveyance path is inappropriate and keeps the operation device from accepting a document scanning instruction until the controller accepts through the operation device a second instruction for conveying the original document through the linear conveyance path.

8. An image forming apparatus comprising:
   the image reading device according to claim 1; and
   an image forming device that forms on a recording paper sheet the image of the original document read by the image reading device.

* * * * *